United States Patent
Chakkirala

(10) Patent No.: US 10,389,243 B2
(45) Date of Patent: Aug. 20, 2019

(54) CURRENT LIMIT BOOST CONVERTER

(71) Applicant: QUALCOMM Incorporated, San Diego, CA (US)

(72) Inventor: Subbarao Chakkirala, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/451,554

(22) Filed: Mar. 7, 2017

(65) Prior Publication Data

US 2018/0262106 A1 Sep. 13, 2018

(51) Int. Cl.
- *H02M 1/00* (2006.01)
- *H02M 1/08* (2006.01)
- *H02M 1/32* (2007.01)
- *H02M 3/158* (2006.01)

(52) U.S. Cl.
CPC ............ *H02M 3/158* (2013.01); *H02M 1/08* (2013.01); *H02M 1/32* (2013.01); *H02M 2001/0009* (2013.01)

(58) Field of Classification Search
CPC .................................................. H02M 3/158
See application file for complete search history.

(56) References Cited

U.S. PATENT DOCUMENTS

| | | | |
|---|---|---|---|
| 6,229,293 B1 * | 5/2001 | Farrenkopf | H02M 3/156 323/222 |
| 7,592,777 B2 | 9/2009 | Lu et al. | |
| 8,299,773 B2 | 10/2012 | Jang et al. | |
| 8,791,644 B2 | 7/2014 | Vitunic et al. | |
| 8,829,868 B2 | 9/2014 | Waltman et al. | |
| 9,312,772 B2 | 4/2016 | Qiu et al. | |
| 2003/0122530 A1 * | 7/2003 | Hikita | G05F 1/573 323/285 |
| 2006/0012932 A1 * | 1/2006 | Kitagawa | H02H 3/087 361/93.1 |

(Continued)

OTHER PUBLICATIONS

"Practical Feedback Loop Analysis for Current-Mode Boost Converter", Application Report SLVA636, SW Lee, Texas Instruments, Mar. 2014, 12 Pages.

(Continued)

*Primary Examiner* — Jue Zhang
*Assistant Examiner* — Trinh Q Dang
(74) *Attorney, Agent, or Firm* — Patterson & Sheridan, LLP

(57) ABSTRACT

Certain aspects of the present disclosure generally relate to a boost converter. The boost converter generally includes an inductor coupled to a first node, a first switch coupled between the first node and a reference node for the boost converter, and a feedback control circuit. The feedback control circuit may include a first input coupled to the first node, a second input coupled to a terminal of the first switch, and an output coupled to a control input of the first switch. The feedback control circuit may include a first amplifier having a first input coupled to the first input of the feedback control circuit and a second input coupled to a first reference voltage source. The feedback control circuit may also include a second amplifier having a first input coupled to a second reference voltage source and an output coupled to a power supply node of the first amplifier.

28 Claims, 5 Drawing Sheets

(56) References Cited

U.S. PATENT DOCUMENTS

| | | | | |
|---|---|---|---|---|
| 2009/0160422 A1* | 6/2009 | Isobe | ............... | H02M 3/156 |
| | | | | 323/349 |
| 2010/0002473 A1* | 1/2010 | Williams | ............ | H02M 3/158 |
| | | | | 363/21.06 |
| 2010/0019749 A1* | 1/2010 | Katsuya | ............ | H02M 1/15 |
| | | | | 323/282 |
| 2011/0273158 A1* | 11/2011 | Mateu | ............ | H02M 3/156 |
| | | | | 323/303 |
| 2012/0026765 A1* | 2/2012 | Adragna | ............ | H02M 1/4225 |
| | | | | 363/78 |
| 2013/0043849 A1* | 2/2013 | Pagano | ............ | H02M 3/156 |
| | | | | 323/271 |
| 2014/0139198 A1* | 5/2014 | Manlove | ............ | H02M 3/156 |
| | | | | 323/282 |
| 2015/0062108 A1* | 3/2015 | Archibald | ............ | H02M 3/156 |
| | | | | 345/212 |
| 2015/0378378 A1* | 12/2015 | Zhang | ............ | G05F 1/56 |
| | | | | 323/280 |
| 2017/0126128 A1* | 5/2017 | Li | ............ | H02M 1/08 |

OTHER PUBLICATIONS

Qiao C., et al., "Control of Boost Type Converter in Discontinuous Conduction Mode by Controlling the Product of Inductor Voltage-Second", Power Electronics Specialists Conference, 2005. PESC '05. IEEE 36$^{th}$, 2005, 8 Pages.

* cited by examiner

CURRENT LIMIT BOOST CONVERTER

TECHNICAL FIELD

Certain aspects of the present disclosure generally relate to electronic circuits and, more particularly, to a circuit for a boost converter.

BACKGROUND

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as direct current (DC)-to-DC conversion, battery charging, power-source selection, voltage scaling, power sequencing, etc. For example, a PMIC may feature a boost converter to boost a voltage level of a DC input voltage.

SUMMARY

Certain aspects of the present disclosure generally relate to a boost converter including a current-mode feedback control circuit.

Certain aspects of the present disclosure provide a boost converter. The boost converter generally includes an inductor coupled to a first node; a first switch coupled between the first node and a reference node for the boost converter; and a feedback control circuit having a first input coupled to the first node, a second input coupled to a terminal of the first switch, and an output coupled to a control input of the first switch, the feedback control circuit comprising: a first amplifier having a first input coupled to the first input of the feedback control circuit and a second input coupled to a first reference voltage source; and a second amplifier having a first input coupled to a second reference voltage source and an output coupled to a power supply node of the first amplifier.

Certain aspects of the present disclosure provide a method for generating a boosted voltage. The method generally includes comparing the boosted voltage or an indication of the boosted voltage to a reference voltage via an amplifier, controlling a first switch of a boost converter used to generate the boosted voltage, based on the comparison, and setting a supply voltage of the amplifier based on a current limit for the boost converter.

Certain aspects of the present disclosure provide an apparatus for generating a boosted voltage. The apparatus generally includes means for comparing the boosted voltage or an indication of the boosted voltage to a reference voltage, means for controlling a switch of the apparatus based on the comparison, and means for setting a supply voltage of the means for comparing based on a current limit for the apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Wireless System

Figure 1:
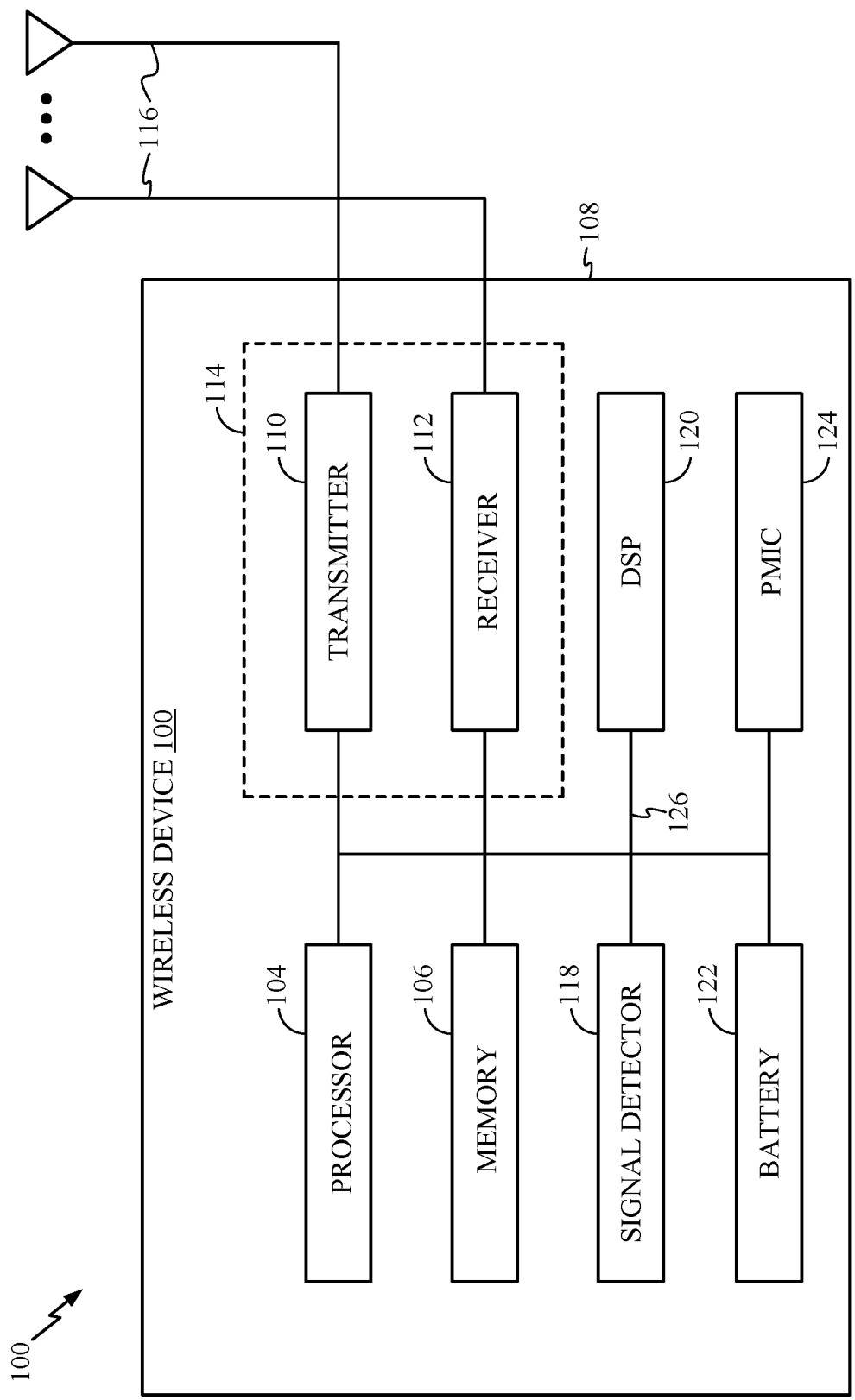
FIG. 1 is a block diagram of an example device including a voltage regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the DC-to-DC converter of the PMIC 124 may include a boost converter as described herein.

The various components of the device 100 may be coupled together by a bus system 126, which may include a power bus, a control signal bus, and a status signal bus in addition to a data bus.

Example Current Limit Boost Converter

Certain aspects of this present disclosure generally relate to a boost converter implemented using a current limit circuit, the current limit circuit configured to limit an inductor current of the boost converter. A current limit circuit for a boost converter may experience variations in the current limit setting due to resistance variations. Moreover, a current limit circuit may use an independent control loop which may impact the main signal loop. Certain aspects of the present disclosure are directed to a current limit circuit that provides little to no dependence on resistance variation, improves stability during over-current conditions, and allows for high power delivery to a load.

Figure 2:
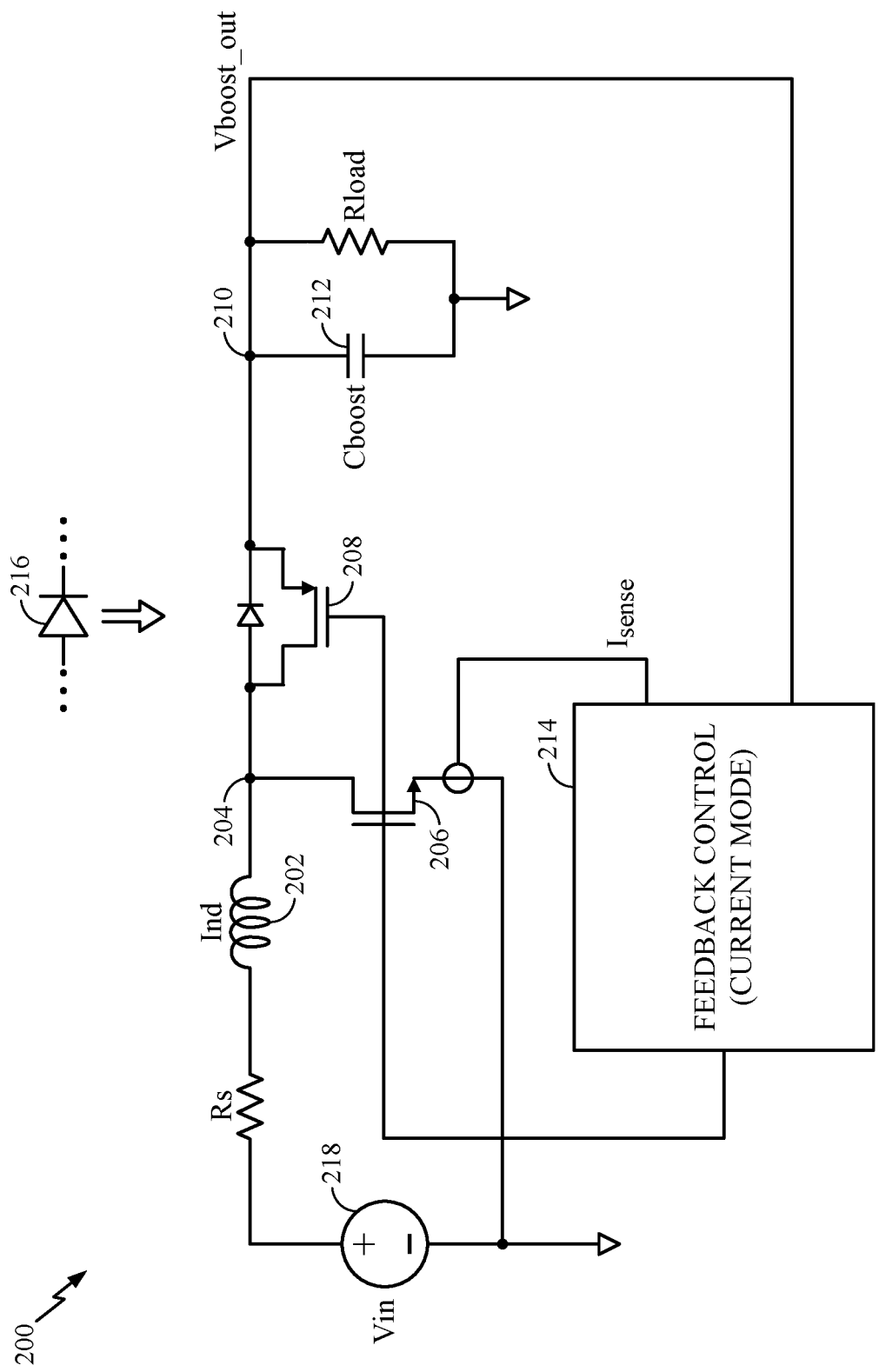
FIG. 2 illustrates an example boost converter, in accordance with certain aspects of the present disclosure.

FIG. 2 illustrates an example boost converter 200, in accordance with certain aspects of the present disclosure. The boost converter 200 includes an inductor 202 and a switch 206, both coupled to a node 204. The boost converter 200 also includes a switch 208 coupled between the node 204 and the output node 210 of the boost converter. The output node 210 may be coupled to an energy storage device (e.g., capacitor 212) and a load, which is represented in FIG. 2 by a resistor Rload.

The switch 206 may be controlled by a pulse-width modulation (PWM) signal to open and close the switch 206 in an effort to regulate a voltage across the capacitor 212 (i.e., the voltage Vboost_out at the output node 210). For example, during a first period, the switch 206 may be closed, transferring energy from the power supply 218 and storing the energy in the inductor 202. The switch 206 may be opened during a second period, transferring the energy stored in the inductor 202 to the capacitor 212 through the switch 208. In certain aspects, the switch 208 may be replaced with a diode 216, as illustrated, and the energy stored in the inductor 202 is transferred to the capacitor 212 via the diode 216. In some cases, as illustrated in FIG. 2, the switch 208 may be implemented with a p-channel metal-oxide semiconductor (PMOS) transistor, which includes a body diode performing the same function as diode 216.

As illustrated, the boost converter 200 also includes a current mode feedback control circuit 214. The feedback control circuit 214 may control the switch 206, and in some cases, also switch 208 based on both the voltage Vboost_out at the output node 210 and a current at a node coupled to switch 206. For example, the feedback control circuit 214 may receive a current sense signal Isense that is representative of the current across switch 206. Isense also represents the current across the inductor 202 during a period of time when switch 206 is closed. However, in some cases, the feedback control circuit 214 may directly sense the current across the inductor 202. Based on Isense and Vboost_out, the feedback control circuit 214 controls the current across inductor 202 by controlling the duty-cycle of the PWM signal used to drive switch 206 (and switch 208).

Figure 3:
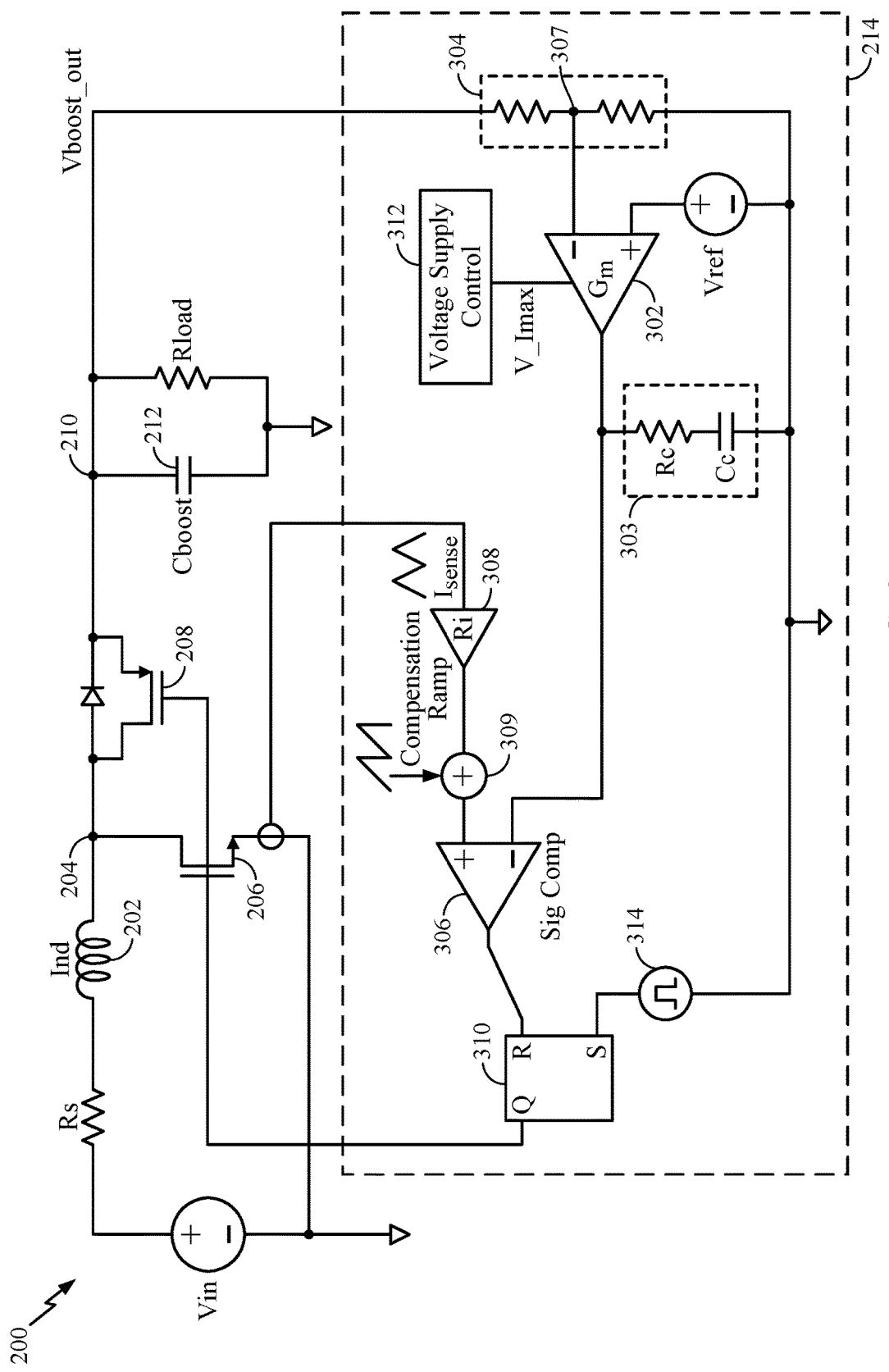
FIG. 3 illustrates an example boost converter and an example feedback control circuit, in accordance with certain aspects of the present disclosure.

FIG. 3 illustrates the example boost converter 200 and example implementation details of the feedback control circuit 214, in accordance with certain aspects of the present disclosure. As illustrated, the feedback control circuit 214 includes an amplifier 302 (e.g., a transconductance (Gm) amplifier) coupled to a tap 307 of a voltage divider circuit 304. The voltage divider circuit 304 is used to step down the voltage Vboost_out. Thus, the amplifier 302 may compare the voltage at the tap 307 to a reference voltage Vref and generate an output current. The output of the amplifier 302 may be coupled to an impedance 303 to convert the output current of the amplifier 302 to a voltage. In certain aspects, the impedance 303 may be implemented using a resistor Rc connected in series with a capacitor Cc.

The feedback control circuit 214 may also include an amplifier 306 (e.g., a comparator) configured to receive a signal representative of Isense for comparison to the voltage at the output of amplifier 302. For example, the current Isense may be converted to a current sense voltage via a current-to-voltage converter 308. In certain aspects, a compensation ramp signal may be added (e.g., via adder 309) to the current sense voltage for slope compensation and to stabilize the current loop feedback.

In certain aspects, the feedback control circuit 214 also includes a flip-flop 310 (e.g., a set-reset (SR) flip-flop) for controlling the switch 206. For example, the set (S) input of the flip-flop 310 may be coupled to a pulse generator circuit 314, and the reset (R) input of the flip-flop 310 may be coupled to the output of the amplifier 306. The pulse generator circuit 314 may generate a pulse signal for driving the S input of the flip-flop 310. The pulse signal may have a periodic waveform with a duty cycle that is less than fifty percent. The flip-flop 310 may generate a PWM output signal, the duty-cycle of which is controlled based on Isense and Vboost_out.

Certain aspects of the present disclosure provide techniques for setting a current limit for the boost converter 200. For example, a voltage supply control circuit 312 may be used to set and/or adjust the voltage rail V_Imax of the amplifier 302 based on a desired current limit (e.g., a maximum) for the boost converter 200. The output current and voltage of the amplifier 302 can be limited by setting the voltage rail V_Imax of amplifier 302 to a particular voltage. Thus, by setting the voltage rail V_Imax of amplifier 302, the inductor current of the boost converter may be limited by limiting the duty-cycle of the PWM signal used to drive switch 206.

Figure 4:
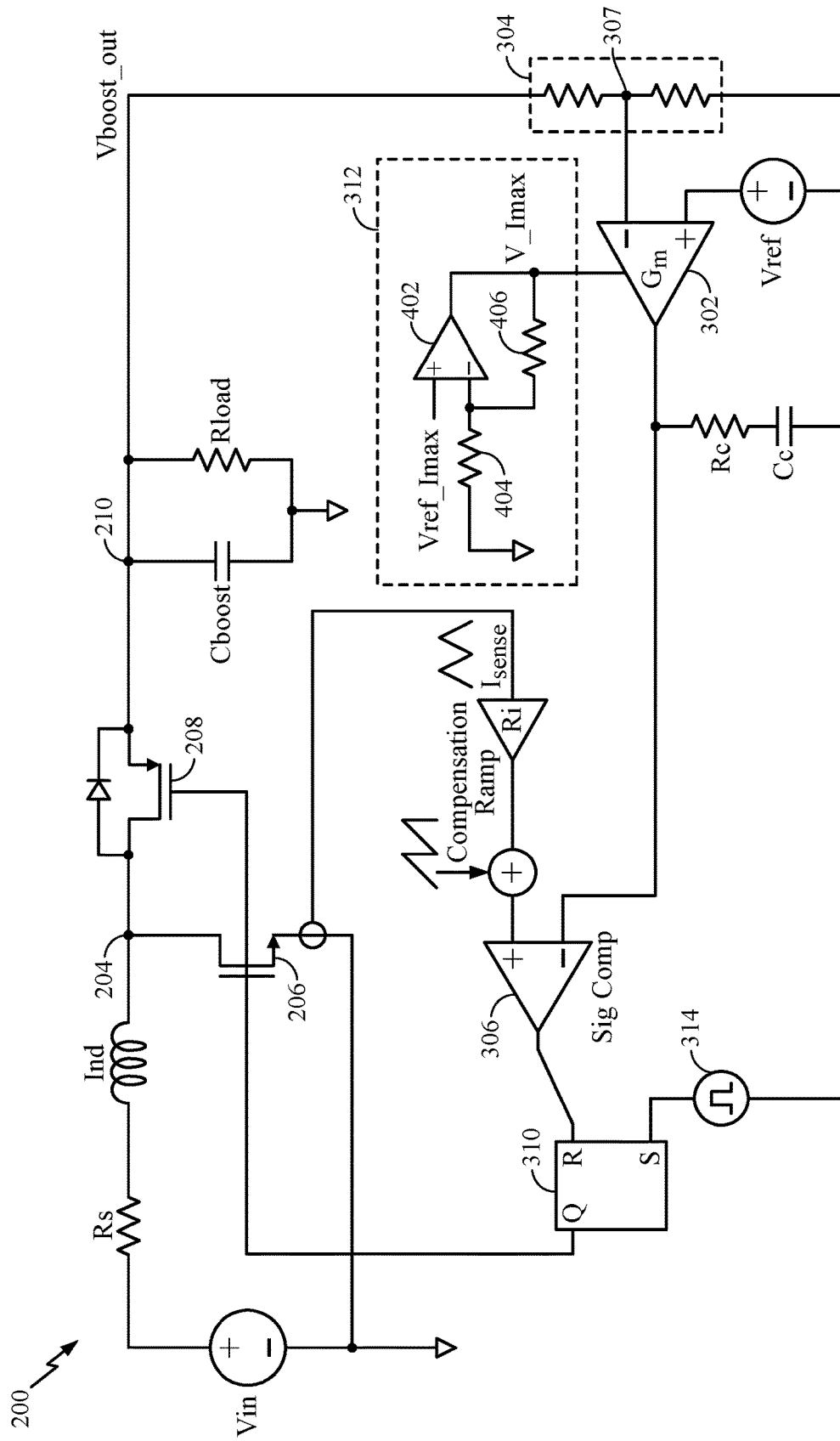
FIG. 4 illustrates an example boost converter and an example voltage supply control circuit, in accordance with certain aspects of the present disclosure.

FIG. 4 illustrates the example boost converter 200 and example implementation details of the voltage supply control circuit 312, in accordance with certain aspects of the present disclosure. The voltage supply control circuit 312 may be implemented using an amplifier 402. In certain aspects, the amplifier 402 may be configured as a non-inverting amplifier. For example, a reference voltage Vref_Imax may be received at a positive input of the amplifier 312. Furthermore, the voltage supply control circuit 312 may include a resistive device 404 coupled between a reference potential (e.g., electric ground) and the negative input of the amplifier 402, and a resistive device 406 coupled between the negative input and the output of the amplifier 402. In certain aspects, Vref_Imax may be adjusted to alter the current limit of the boost converter 200. In certain aspects, the ratio of the resistance between the resistive devices 404 and 406 may be adjusted to adjust the current limit of the boost converter 200. By adjusting Vref_Imax and/or the resistance ratio of resistive devices 404 and 406, the voltage rail V_Imax of the amplifier 302 can be controlled, which as described above, limits the duty-cycle of the PWM signal used to drive switch 206. Thus, by controlling the voltage rail V_Imax of the amplifier 302, the current across inductor 202 can be limited. In certain aspects, Vref_Imax and/or the resistance of the resistive components 404 and 406 can be adaptively modified based on one or more parameters such as a ramp compensation slope (e.g., slope of compensation ramp used to stabilize the boost converter 200), frequency of the boost converter 200, a duty cycle of the boost converter 200, the current sense feedback ratio (Ri) of the current-to-voltage converter 308, and a desired current limit of the boost converter 200.

Aspects of the present disclosure provide several advantages. For example, the boost converter of the present disclosure improves stability by allowing continued operation for slope compensation even during over-current conditions. For example, in other current limit architectures, separate feedback loops may be used for current limit operations and slope compensation. Using separate feedback loops may result in the slope compensation operations being disabled during over-current conditions. Aspects of the present disclosure implement over-current protection in the main feedback loop, allowing slope compensation to remain operational even during over-current conditions.

Furthermore, in certain aspects of the present disclosure, since the voltage rail of the amplifier 302 is set by the voltage supply control circuit 312 based on a current limit parameter, the output voltage of the amplifier 302 saturates to a lower voltage level as set by the voltage supply control circuit 312. Thus, voltage overshoot at the output of the amplifier 302 resulting from the feedback loop saturating during an over-current condition is reduced, further improving stability of the boost converter 200. By improving stability, the boost converter 200 is capable of delivering higher power to the load.

In addition, certain aspects of the present disclosure allow for a stable current limit setting due to reduced dependence on resistance variations. For example, as described above, other current limit architectures may use a separate feedback loop for current limit operations which may include one or more resistors (Rsns) for sensing the boost converter current. Variations in Rsns can impact the current limit settings of the boost converter. However, certain aspects of the present disclosure eliminate (or reduce) dependency on resistance variations.

Figure 5:
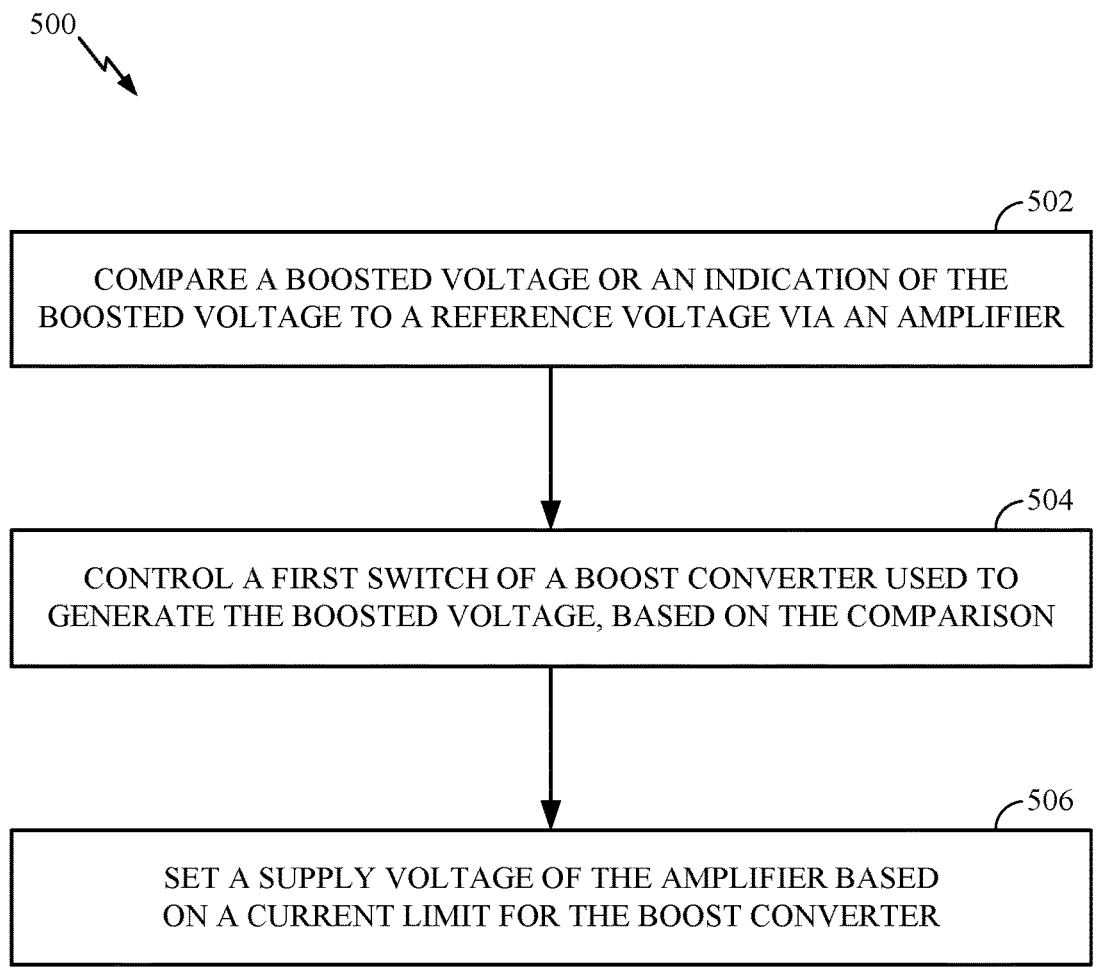
FIG. 5 is a flow diagram illustrating example operations for generating a boosted voltage, in accordance with certain aspects of the present disclosure.

FIG. 5 is a flow diagram illustrating example operations 500 for generating a boosted voltage (e.g., Vboost_out), in accordance with certain aspects of the present disclosure. The operations 500 may be performed by a circuit, such as the circuits of FIGS. 2-4.

The operations 500 begin, at block 502, by comparing the boosted voltage (e.g., Vboost_out) or an indication of the boosted voltage (e.g., voltage at tap 307) to a reference voltage (e.g., Vref) via an amplifier (e.g., amplifier 302). At block 504, the circuit controls a first switch (e.g., switch 206) of a boost converter (e.g., boost converter 200) used to generate the boosted voltage, based on the comparison. At block 506, the circuit sets a supply voltage (V_Imax) of the amplifier based on a current limit for the boost converter.

In certain aspects, setting the supply voltage of the amplifier may include controlling the supply voltage of the amplifier via another amplifier (e.g., amplifier 402) based on another reference voltage (e.g., Vref_Imax). In certain aspects, the other amplifier may be coupled to a first resistive element (e.g., resistive device 404) and a second resistive element (e.g., resistive device 406). In this case, the supply voltage may be controlled based on a ratio of the first resistive element and the second resistive element. In certain aspects, the operations 500 may also include receiving the other reference voltage at a first input (e.g., positive input) of the other amplifier. In this case, the first resistive element may be coupled between a second input (e.g., negative input) of the other amplifier and a reference node (e.g., electric ground), and the second resistive element may be coupled between an output and the second input of the other amplifier. In certain aspects, the operations 500 also include voltage dividing (e.g., via voltage divider circuit 304) the boosted voltage to generate the indication of the boosted voltage.

In certain aspects, the operations 500 may also include sensing a current at a node coupled to the first switch. In this case, the first switch is further controlled based on the sensed current. In some cases, the operations 500 may also include comparing a voltage (e.g., voltage at positive input of amplifier 306) representative of the sensed current with a voltage (e.g., voltage at negative input of amplifier 306) representative of an output current from the amplifier, wherein the first switch is controlled based on the comparison between the representative voltages. In certain aspects, the operations 500 may also include generating a pulse signal (e.g., via pulse generator circuit 314), setting a flip-flop (e.g., flip-flop 310) based on the pulse signal, and resetting the flip-flop based on the comparison between the representative voltages, wherein the first switch is controlled based on an output signal of the flip-flop.

In certain aspects, the operations 500 also include controlling a second switch (e.g., switch 208) of the boost converter, based on the comparison, the second switch configured to transfer charge from an inductor (e.g., inductor 202) of the boost converter to a load (e.g., Rload). In certain aspects, the operations 500 also include closing the first switch during a first time interval to charge an inductor (e.g., inductor 202) of the boost converter, and opening the first switch during a second time interval to transfer a charge of the inductor to a capacitor (e.g., Cboost) of the boost converter.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

For example, means for comparing, means for setting a voltage, and means for resetting may comprise an amplifier such as the amplifier 302, amplifier 402, or amplifier 306. Means for controlling may comprise an amplifier (e.g., amplifier 306), a signal generator (e.g., pulse generator circuit 314), and/or a flip-flop (e.g., flip-flop 310). Means for generating or means for voltage dividing may comprise a voltage divider, such as the voltage divider 304. Means for sensing may comprise a resistor (e.g., a current-sensing resistor), a current probe, and/or a current-to-voltage converter, such as the current-to-voltage converter 308. Means for setting a flip-flop may comprise a signal generator, such as the pulse generator circuit 314.

As used herein, the term "coupled" may include electromagnetic coupling. For example, the feedback control circuit 214 may be electromagnetically coupled to the boost converter 200 to sense the boost converter current (e.g., via an inductor probe).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A boost converter comprising:
   an inductor coupled to a first node;
   a first switch coupled between the first node and a reference node for the boost converter; and
   a feedback control circuit having a first input coupled to the first node, a second input coupled to a terminal of the first switch, and an output coupled to a control input of the first switch, the feedback control circuit comprising:
      a first amplifier having a first input coupled to the first input of the feedback control circuit and a second input coupled to a first reference voltage source; and a second amplifier having a first input configured to receive a current limit input voltage, the current limit input voltage being configured to limit an amount of current flowing across the inductor, wherein the second amplifier comprises a second input coupled to the reference node and an output coupled to a power supply node of the first amplifier.

2. The boost converter of claim 1, further comprising a diode coupled between the first node and a second node, wherein the first input of the feedback control circuit is coupled to the second node.

3. The boost converter of claim 1, further comprising a voltage divider having an input coupled to the first input of the feedback control circuit, wherein the first input of the first amplifier is coupled to a tap of the voltage divider.

4. The boost converter of claim 1, further comprising:
a first resistive element coupled between the second input of the second amplifier and the reference node; and
a second resistive element coupled between the output of the second amplifier and the second input of the second amplifier.

5. The boost converter of claim 1, further comprising impedance coupled between the output of the first amplifier and the reference node.

6. The boost converter of claim 1, wherein the first switch comprises an NMOS transistor, wherein the output of the feedback control circuit is coupled to a gate of the NMOS transistor, wherein a drain of the NMOS transistor is coupled to the first node, and wherein a source of the NMOS transistor is coupled to the reference node.

7. The boost converter of claim 1, wherein the first amplifier comprises a transconductance amplifier.

8. The boost converter of claim 1, further comprising a comparator having a first input coupled to the second input of the feedback control circuit, a second input coupled to an output of the first amplifier, and an output coupled to the control input of the first switch.

9. The boost converter of claim 2, further comprising a second switch coupled between the first node and the second node, wherein the output of the feedback control circuit is coupled to a control input of the second switch.

10. The boost converter of claim 2, further comprising a capacitor coupled between the second node and the reference node.

11. The boost converter of claim 5, wherein the impedance comprises a resistor and a capacitor connected in series.

12. The boost converter of claim 8, further comprising a flip-flop having an input coupled to an output of the comparator and an output coupled to the control input of the first switch.

13. The boost converter of claim 12, wherein the flip-flop comprises a set-reset (SR) flip-flop, wherein the input of the flip-flop comprises a reset (R) input of the flip-flop, and wherein a set (S) input of the flip-flop is coupled to a pulse generator circuit.

14. A method for generating a boosted voltage, comprising:
comparing the boosted voltage or an indication of the boosted voltage to a reference voltage via an amplifier;
controlling a first switch of a boost converter used to generate the boosted voltage using a duty cycle of a pulse width modulated (PWM) signal based on the comparison;
setting a supply voltage of the amplifier based on a current limit for the boost converter; and
limiting the duty cycle of the PWM signal via the amplifier based on the set supply voltage, wherein setting the supply voltage of the amplifier comprises controlling the supply voltage of the amplifier via another amplifier having a first input configured to receive a current limit input voltage, the limiting of the duty cycle being based on the current limit input voltage, wherein the other amplifier comprises a second input coupled to a reference node and an output coupled to a power supply node of the amplifier.

15. The method of claim 14, wherein the other amplifier is coupled to a first resistive element and a second resistive element, wherein the supply voltage is controlled based on a ratio between the first resistive element and the second resistive element.

16. The method of claim 14, further comprising:
voltage dividing the boosted voltage to generate the indication of the boosted voltage.

17. The method of claim 14, further comprising:
sensing a current at a node coupled to the first switch, wherein the first switch is further controlled based on the sensed current.

18. The method of claim 14, further comprising:
controlling a second switch of the boost converter, based on the comparison, the second switch being configured to transfer charge from an inductor of the boost converter to a load.

19. The method of claim 14, further comprising:
closing the first switch during a first time interval to charge an inductor of the boost converter; and
opening the first switch during a second time interval to transfer a charge of the inductor to a capacitor of the boost converter.

20. The method of claim 15, wherein:
the first resistive element is coupled between the second input of the other amplifier and the reference node; and
the second resistive element is coupled between the output of the other amplifier and the second input of the other amplifier.

21. The method of claim 17, further comprising:
comparing a voltage representative of the sensed current with a voltage representative of an output current from the amplifier, wherein the first switch is controlled based on the comparison between the representative voltages.

22. The method of claim 21, further comprising:
generating a pulse signal;
setting a flip-flop based on the pulse signal; and
resetting the flip-flop based on the comparison between the representative voltages, wherein the first switch is controlled based on an output signal of the flip-flop comprising the PWM signal.

23. An apparatus for generating a boosted voltage, comprising:
means for comparing the boosted voltage or an indication of the boosted voltage to a reference voltage;
means for controlling a switch of the apparatus using a duty cycle of a pulse width modulated (PWM) signal based on the comparison; and
means for setting a supply voltage of the means for comparing based on a current limit for the apparatus, the supply voltage configured to limit the duty cycle of the PWM signal via the means for comparing, wherein the means for setting the supply voltage of the means for comparing comprises means for controlling the supply voltage of the means for comparing via a means for amplifying having a first input configured to receive a current limit input voltage, the limiting of the duty cycle being based on the current limit input voltage, wherein the means for amplifying comprises a second input coupled to a reference node and an output coupled to a power supply node of the means for comparing.

24. The apparatus of claim 23, further comprising:
means for generating the indication of the boosted voltage.

25. The apparatus of claim 23, further comprising:
means for sensing a current at a node coupled to the switch, wherein the means for controlling is further configured to control the switch based on the sensed current.

26. The apparatus of claim 23, further comprising:
means for selectively transferring charge from an inductor of the apparatus to a load for the apparatus, wherein the means for controlling the switch is further configured to control the means for selectively transferring charge, based on the comparison.

27. The apparatus of claim 25, wherein the means for controlling comprises means for comparing a voltage representative of the sensed current with a voltage representative of an output current from the means for comparing the boosted voltage or the indication thereof to the reference voltage, wherein the means for controlling is configured to control the switch based on the comparison between the representative voltages.

28. The apparatus of claim 27, wherein the means for controlling the switch comprises:
  means for setting a flip-flop based on a pulse signal; and
  means for resetting the flip-flop based on the comparison between the representative voltages, wherein the means for controlling is configured to control the switch based on an output signal of the flip-flop, the output signal comprising the PWM signal.

* * * * *